Inventor:
Russell Brownfield,
by Thos. A. Beaney Atty.

United States Patent Office 3,559,514
Patented Feb. 2, 1971

3,559,514
REAMERS FOR ELECTRICAL LINE CONDUITS, AND THE LIKE
Russell Brownfield, 6126 S. Langley Ave., Chicago, Ill. 60637
Filed June 17, 1968, Ser. No. 737,634
Int. Cl. B23d 77/12
U.S. Cl. 77—73                                     2 Claims

ABSTRACT OF THE DISCLOSURE

A reamer for reaming the ends of pipes, conduits, and the like which carry electrical conductors, to remove burrs, slivers, and the like from the pipe ends, without need of removing the conductors from the pipe or injury to such conductors during reaming; the reamer being provided with a central passage extending from the groove to the rear end of the reamer, so that the electrical lines may be laid down into such groove and passage preparatory to the reaming operation, being accommodated within the groove and passage during the reaming operation, and so that the electrical lines may be removed from the groove and passage after conclusion of the reaming operation.

---

Figure 1:
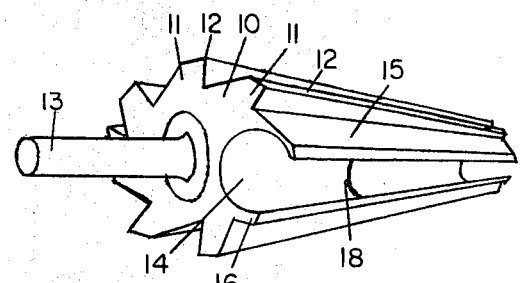

This invention relates to improvements in reamers especially intended for reaming electrical pipes and conduits carrying electrical lines, without need of removing such electrical lines from the conduits, or severing such lines in order to enable the reaming operation to be performed. Accordingly, the reaming operations may be performed on live line conduits, without discontinuing the service of such lines during the reaming operations. The benefits flowing from ability to perform the reaming operations without disturbance of continuity of electrical service being rendered by the lines carried by the conduits, will be readily apparent, and need not be enlarged upon here.

My invention comprises the provision of a radially extending groove extending the length of the reamer and reaching to or somewhat beyond the axis of the reamer, sufficient to accommodate the electrical lines already present in the conduit. Accordingly, preparatory to the reaming operation to be performed on the end of the conduit, the electrical lines are laid down into the groove, and the reamer is then set into reaming engagement with the end of the conduit, the electrical lines being then located centrally of the reamer, and in position such that they do not interfere with the conventional reaming operation. When the reaming operation has been completed the reamer is withdrawn from the conduit end, thus exposing the full length of the groove beyond the conduit end, and enabling free withdrawal of the electrical conductors from the reamer.

It has been found that such grooved reamer structure of satisfactory form may be produced by producing the groove as a deepening of one of the valleys between two of the cutting surfaces of the reamer, and without impairing the usefulness of the reamer for its intended functions. Thus, a reamer provided with the present improvements, may be used for reaming operation other than removing burrs, etc., for conduits. For example, such a reamer provided with my present improvements may be used for reaming holes in flat stock, and for other purposes which will suggest themselves to the student of the present specification. It is important that the groove should be of depth and width to accommodate the number and size of the electrical conductors carried by the conduit, such needs being readily met, as stated above, by deepening the valley between two of the cutting areas of the reamer.

A simple procedure for producing the reamer may also be stated as follows: A central axial passage or hole is drilled throughout the length of a reamer, and the groove may be produced by any suitable cutting operation, to produce such groove of radial dimension to fully engage with such axial passage. Conveniently, the groove is cut to produce a slant from full radial dimension at the front to or driving end of the reamer, and slanting radially down to full opening connection with the previously produced axial hole or passage. By this means the bottom of the groove at its front or drive end of the reamer, may be at a radius which does not interfere with an axially extending drive shaft or nipple by which the reamer may be driven by any conventional drive means, such as a motor-drive. Accordingly, a drive shaft connection may be effected to the reamer without interference from the wires extending from the end of the conduit.

Other objects and uses of the invention will appear from a detailed description of the same, which consists in the features of construction and combinations of parts, hereinafter described and claimed.

Figure 2:
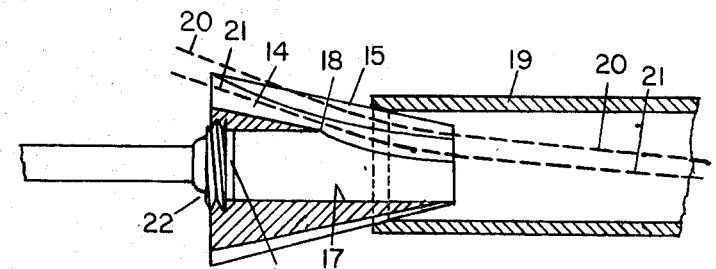
Figure 3:
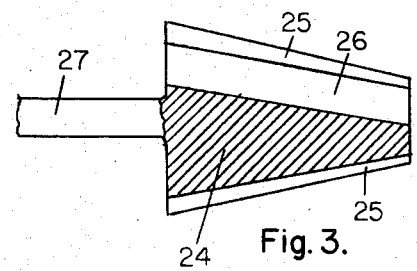

In the drawing:
FIG. 1 shows a perspective view of a reamer modified to include my present improvements;
FIG. 2 shows a longitudinal section through one form of reamer provided with my present improvements; and
FIG. 3 shows a longitudinal section through another form of reamer structure provided with my present improvements; it being noted that the embodiment shown in FIG. 3 may be produced by a simple casting operation, which casting operation includes provision for producing the longitudinal groove without need of subjecting the casting to machine tool operations, other than those needed to produce the cutting edges on the ribs.

Referring to the drawing, the conventional form of reamer is provided with the cone shaped body portion 10, having the cutter blades 11 extending generally radially outwardly from such body portion, and provided with the cutting edges 12, cutting rotation being in the clockwise direction of rotation. The driving stem 13 is shown for the reamer illustrated in FIG. 1.

My improved reamer shown in FIG. 1 includes the longitudinally extending groove 14 which lies between the two cutting ribs 15 and 16. Reference to FIG. 3 shows the provision of such groove, slanting down from the large diameter or drive end of the reamer towards the rear end of the reamer. Examination of FIG. 2 also shows the axial passage or opening 17 extending from the rear end of the reamer and connecting with such groove 14 as shown by the line 18 in FIG. 3 in particular.

In FIG. 2 the reamer is shown engaged with the end of the conduit 19, and the reaming operation has produced the reamed or bevelled end of the conduit opening, thus removing the burrs from the conduit end. The current conductors 20 and 21 are shown extending through the conduit and out from its end; and such conductors are shown as being accommodated within the rear end portion of the axial passage 17 and up along the groove 14 to exit at the left-hand or drive end of the reamer. Accordingly, during drive rotation of the reamer, such conductors are carried around with the reamer, in a circular path of substantially the diameter of the left-hand or drive end of the reamer.

In the embodiment shown in FIGS. 1 and 2, I have shown the drive stem as comprising a stub shaft having an enlarged right-hand or driven end 22 in the form of a flange. Such flange is of size to be threaded into an enlarged socket comprising the end portion of the passage 17. Accordingly, such flange comprises a closure for the left-hand end of the passage 17, as well as comprising a means to connect the stub shaft to the reamer proper.

Although the conductor lines do not enter the left-hand portion of the passage 17, so that it is not necessary to carry such passage leftwardly beyond the area of connection between such passage and the groove 14, it is convenient to carry the drilling operation of such passage completely through the reamer, and form its left-hand end for attachment of the drive shaft thereto, as shown. Conveniently such shaft may include the right-hand end portion 23 extending rightwardly beyond the flange 22, and of size to engage the left-hand end portion of the passage 17, thus giving support to the connection between the shaft and the reamer, other than that afforded by the threaded connection between such parts.

The specific embodiment of my invention as illustrated in the drawing, and specifically described, comprises a reamer structure for reaming ends of conduits, etc. Accordingly, the angle of taper of the cutting elements is great enough to effectively perform such operations. It is noted also, that when such angle of taper is made small enough to conform to reaming operations for finishing the tubular surfaces of conduits, I also contemplate the inclusion of my present invention in such tubular surface reamers. In such case the groove extends radially inwardly for the full length of such surface reamer, so that any wires or conduits carried by the tubular element being surface reamed, may be introduced into and removed from the grooves without disturbing the continuity of service being rendered by the electrical lines.

In FIG. 3 I have shown another embodiment of my invention, as follows:

The reamer body is a cast unit, including the central portion 24, provided with the cutting ribs 25 and the drive shaft connection 27; and the casting operation includes provision for producing the longitudinally extending groove 26, extending from end to end of the unit, and radially open throughout its length, so that the conductors may be received into or withdrawn from such groove by radial movement, and without need of severing such conductors or interfering with the service being rendered by them.

I claim:

1. A reamer unit comprising a conically tapered element provided with radially extending cutting ribs, and provided with a reamer drive shaft element extending axially from the larger end of the cone; together with a longitudinally extending open, electrical conductor receiving groove extending the axial length of the reamer; both ends of such groove being axially open to accommodate electrical conductors extending into and along and out from the groove, from end to end of the reamer; wherein the reamer is provided with a central axially extending bore open at the small end of the cone, and closed at the larger end of the cone, and wherein the conductor receiving groove has its floor slanting radially inwardly from the larger end of the cone to a line of mergence with the axially extending bore.

2. A reamer as defined in claim 1; wherein the closure of the centrally extending bore comprises a drive shaft unit including said closure, and removably connected to the conical body.

References Cited

UNITED STATES PATENTS

| | | | |
|---|---|---|---|
| 1,791,649 | 2/1931 | Vosper | 77—73 |
| 1,049,124 | 12/1912 | Merriam | 77—73 |
| 644,595 | 3/1900 | Grabler | 77—73 |

FRANCIS S. HUSAR, Primary Examiner